United States Patent
Kim et al.

(10) Patent No.: US 10,732,799 B2
(45) Date of Patent: *Aug. 4, 2020

(54) ELECTRONIC DEVICE FOR PLAYING-PLAYING CONTENTS AND METHOD THEREOF

(71) Applicant: Samsung Electronics Co., Ltd., Gyeonggi-do (KR)

(72) Inventors: Hyun-Kyoung Kim, Seoul (KR); Dae-Sung Kim, Gyeonggi-do (KR); So-Ra Kim, Seoul (KR); Hang-Kyu Park, Seoul (KR); Seung-Kyung Lim, Seoul (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/402,886

(22) Filed: May 3, 2019

(65) Prior Publication Data
US 2019/0258364 A1 Aug. 22, 2019

Related U.S. Application Data

(63) Continuation of application No. 15/581,810, filed on Apr. 28, 2017, now Pat. No. 10,282,061, which is a (Continued)

(51) Int. Cl.
*G06F 3/0482* (2013.01)
*H04N 5/232* (2006.01)
(Continued)

(52) U.S. Cl.
CPC ........ *G06F 3/0482* (2013.01); *G06F 3/04886* (2013.01); *G06K 9/00288* (2013.01);
(Continued)

(58) Field of Classification Search
CPC .............. G06F 3/0482; G06F 3/04886; G06K 9/00288; H04N 1/00161; H04N 5/23293
See application file for complete search history.

(56) References Cited

U.S. PATENT DOCUMENTS

2007/0300158 A1* 12/2007 Kasperkiewicz ....... G06F 16/40
715/731
2009/0079847 A1* 3/2009 Ohtsuka ................. G11B 27/28
348/231.2

(Continued)

FOREIGN PATENT DOCUMENTS

JP 2007-226536 9/2007
JP 2008165424 7/2008
(Continued)

OTHER PUBLICATIONS

KR Notice of Patent Grant dated Aug. 26, 2019 issued in counterpart application No. 10-2013-0001066, 4 pages.
(Continued)

*Primary Examiner* — Ahmed A Berhan
(74) *Attorney, Agent, or Firm* — The Farrell Law Firm, P.C.

(57) ABSTRACT

A method and a portable communication device are provided. The portable communication device includes a touch screen, memory, and a processor adapted to identify, with respect to a plurality of images stored in the memory, first tag information corresponding to a location at which a first image of the plurality of images is taken, second tag information corresponding to an object recognized from the first image or a second image of the plurality of images, and third tag information corresponding to a specified application used to acquire the first image, the second image, or a third image of the plurality of the images, display, via the touch screen, a first menu related to the first tag information, a second menu related to the second tag information, or a (Continued)

third menu related to the third tag information, receive a selection of the first menu, the second menu, or the third menu, and display, via the touch screen, a user interface of a first user interface corresponding to the first menu, a second user interface corresponding to the first menu, and a third user interface corresponding to the third menu, based at least in part on the selection of a corresponding menu of the first menu, the second menu, and the third menu.

20 Claims, 17 Drawing Sheets

Related U.S. Application Data continuation of application No. 14/330,864, filed on Jul. 14, 2014, now Pat. No. 9,641,761.

(51) Int. Cl.

| | | |
|---|---|---|
| *G06K 9/00* | (2006.01) | |
| *G06F 3/0488* | (2013.01) | |
| *G11B 27/34* | (2006.01) | |
| *G11B 27/32* | (2006.01) | |
| *G11B 27/10* | (2006.01) | |
| *H04N 1/00* | (2006.01) | |
| *G11B 27/00* | (2006.01) | |
| *H04N 5/77* | (2006.01) | |

(52) U.S. Cl.
CPC ............ *G11B 27/00* (2013.01); *G11B 27/105* (2013.01); *G11B 27/32* (2013.01); *G11B 27/34* (2013.01); *H04N 1/00161* (2013.01); *H04N 5/23216* (2013.01); *H04N 5/23293* (2013.01); *H04N 5/772* (2013.01)

(56) References Cited

U.S. PATENT DOCUMENTS

| | | | |
|---|---|---|---|
| 2010/0268729 A1 | 10/2010 | Nara et al. | |
| 2011/0052069 A1 | 3/2011 | Nakabayashi et al. | |
| 2012/0098999 A1* | 4/2012 | Chen .................... | H04N 1/3871 348/231.5 |
| 2013/0089243 A1 | 4/2013 | Sauve et al. | |
| 2014/0129981 A1* | 5/2014 | Soderberg ............. | G06F 3/0482 715/810 |
| 2014/0359483 A1* | 12/2014 | Forutanpour ......... | G06F 3/0482 715/753 |

FOREIGN PATENT DOCUMENTS

| | | |
|---|---|---|
| JP | 2009-124206 | 6/2009 |
| JP | 2011-048668 | 3/2011 |
| JP | 2012-191629 | 10/2012 |
| KR | 20060031198 | 12/2006 |
| KR | 20110134655 | 12/2011 |

OTHER PUBLICATIONS

Korean Office Action dated Mar. 27, 2019 issued in counterpart application No. 10-2013-0001066, 15 pages.
Korean Office Action dated Jan. 2, 2020 issued in counterpart application No. 10-2019-0152701, 15 pages.

* cited by examiner

FIG.4

|          |       |            |              |          |
|----------|-------|------------|--------------|----------|
|          |  |  |  |  |
| Face     | –     | Jane, Tom  | Alice, Bill  | James    |
| Weather  | Sunny | Rainy      | Sunny        | Snowy    |
| Location | Paris | Home       | Versailles   | Yosemite |
| Event    | Travel| Daily life | Picnic       | Travel   |
| Time     | Night | Night      | Day          | Day      |

ELECTRONIC DEVICE FOR PLAYING-PLAYING CONTENTS AND METHOD THEREOF

PRIORITY

This application is a Continuation Application of, and claims priority under 35 U.S.C. § 120 to, U.S. patent application Ser. No. 15/581,810, filed in the U.S. Patent and Trademark Office on Apr. 28, 2017, and issuing as U.S. Pat. No. 10,282,061 on May 7, 2019, which is a Continuation Application of U.S. patent application Ser. No. 14/330,864, filed in the U.S. Patent and Trademark Office on Jul. 14, 2014, and issued as U.S. Pat. No. 9,641,761 on May 2, 2017, the entire disclosure of each of which is incorporated herein by reference.

BACKGROUND

1. Field of the Disclosure

The present disclosure relates to an electronic device, and more particularly, to a method and device for dynamically playing contents, according to a setting condition in an electronic device.

2. Description of the Related Art

A camera is provided in most portable terminals to provide a photographing function. Particularly, the portable terminal may provide a slide show function that allows a user to view an image taken through a camera or an image received from an external device on a screen of the portable terminal. A slide show function is used to sequentially display a series of selected images.

FIGS. 1A and 1B illustrate an example of configuring a picture slide show in the conventional art.

As shown in FIG. 1A, stored pictures are displayed in a thumbnail form, and in this case, multiple pictures to configure a slide show are selected by a user. Here, it is assumed that a picture 1 (100), a picture 2 (101), a picture 6 (102), a picture 7 (103), a picture 8 (104), a picture 11 (105), and a picture 12 (105) are selected by the user for a slide show.

Thereafter, as shown in FIG. 1B, the selected picture 1 (100), picture 2 (101), picture 6 (102), picture 7 (103), picture 8 (104), picture 11 (105), and picture 12 (105) are repeatedly displayed in the selected order on a screen 120.

However, a conventional picture slide show is to show only selected pictures one by one in a constant speed from the start to the end, and after the slide show is configured, there is a problem in that to reconfigure the slide show the user must manually add or delete pictures. Further, by displaying only the pictures selected by the user, there is a problem in that the user may become bored.

Therefore, a method and device for dynamically configuring a picture slide show according to a setting condition are needed.

SUMMARY

An aspect of the present disclosure is to solve at least the above-mentioned problems and/or disadvantages in the conventional art, and to provide at least the advantages described below.

Accordingly, an aspect of the present disclosure is to provide a method and device for dynamically displaying contents in an electronic device, according to a setting condition.

In accordance with an aspect of the present disclosure, a portable communication device is provided that includes a touch screen, a memory and a processor that is configured to identify, with respect to a plurality of images stored in the memory, first tag information with which at least one first image of the plurality of images is tagged, second tag information with which at least one second image of the plurality of images is tagged, and third tag information with which at least one third image of the plurality of images is tagged; display, via the touch screen, a first menu related to the first tag information, a second menu related to the second tag information, and a third menu related to the third tag information in a form of a thumbnail; receive a selection of the first menu, the second menu, or the third menu; and display, via the touch screen, the at least one first image tagged with the first tag information, the at least one second image tagged with the second tag information, or the at least one third image tagged with the third tag information, based at least in part on the selection of the first menu, the second menu, or the third menu. The first tag information corresponds to a location at which the at least one first image is taken, the second tag information corresponds to an object recognized from the at least one second image, and the third tag information corresponds to an application used to acquire the at least one third image.

In accordance with another aspect of the present disclosure, a method of displaying an image in an electronic device is provided. The method includes identifying, with respect to a plurality of images stored in a memory of the electronic device, first tag information with which at least one first image of the plurality of images is tagged, second tag information with which at least one second image of the plurality of images is tagged, and third tag information with which at least one third image of the plurality of images is tagged; displaying a first menu related to the first tag information, a second menu related to the second tag information, and a third menu related to the third tag information in a form of a thumbnail; receiving a selection of the first menu, the second menu, or the third menu; and displaying the at least one first image tagged with the first tag information, the at least one second image tagged with the second tag information, or the at least one third image tagged with the third tag information, based at least in part on the selection of the first menu, the second menu, or the third menu, with the first tag information corresponding to a location at which the at least one first image is taken, the second tag information corresponding to an object recognized from the at least one second image, and the third tag information corresponding to an application used to acquire the at least one third image.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which:

FIG. 4 is a diagram illustrating event tag information, according to a first embodiment of the present disclosure;

DETAILED DESCRIPTION OF EMBODIMENTS OF THE PRESENT DISCLOSURE

Hereinafter, embodiments of the present disclosure will be described with reference to the accompanying drawings. Detailed descriptions of well-known functions and structures incorporated herein may be omitted to avoid obscuring the subject matter of the present disclosure. Also, the terms used herein are defined according to the functions of the present disclosure. Thus, the terms may vary depending on a user's or an operator's intention and usage. That is, the terms used herein must be understood based on the descriptions made herein.

Hereinafter, a method and device for playing contents in an electronic device according to an embodiment of the present disclosure will be described.

Particularly, the present disclosure sets contents to reproduce on a conditional basis using metadata (or tag information) of the contents and recognition technology. Additionally, the present disclosure accurately classifies and reproduces contents, according to an attribute of the contents. Further, the present disclosure automatically updates and reproduces newly added contents based on a setting condition.

In the embodiment of the present disclosure described herein, a picture or an image is referred to as content, but content of the present disclosure are not limited to a picture or an image and may be extended to a picture, a moving picture, music, a game, and an application. For example, the present disclosure may automatically update a music reproduction list to correspond to a condition as well as a simple picture slide show and be used for a function of playing and temporarily storing contents.

Figure 1B:
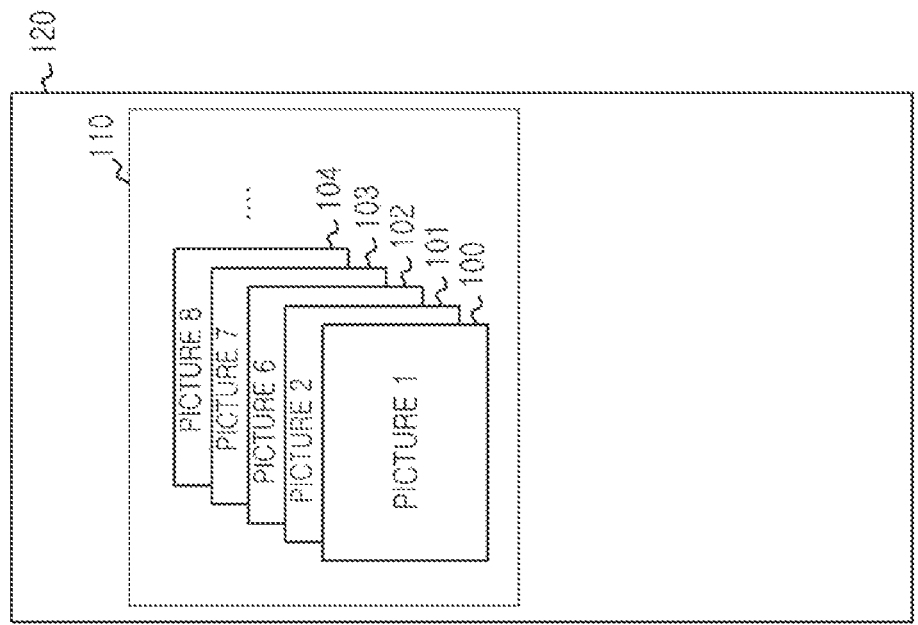
FIGS. 1A and 1B are diagrams illustrating an example of configuring a picture slide show in the conventional art.
Figure 1A:
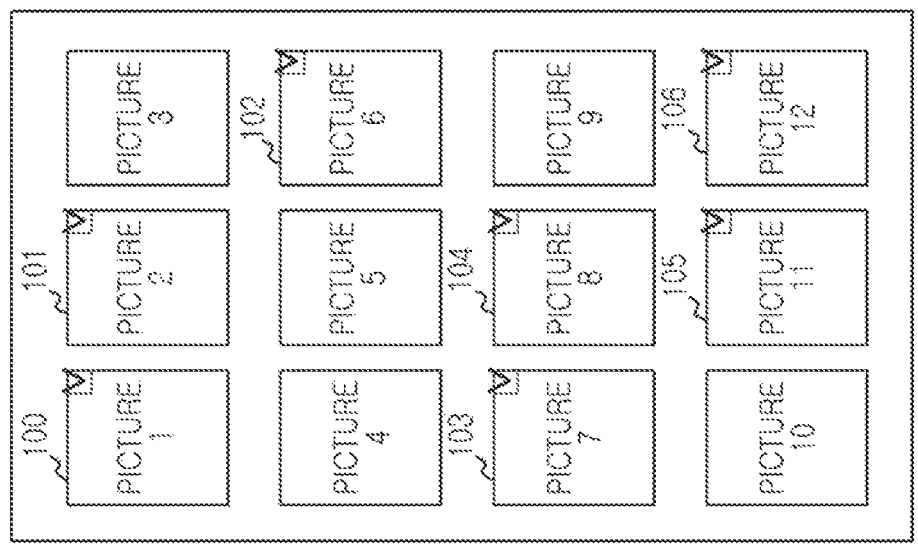
Figure 2:
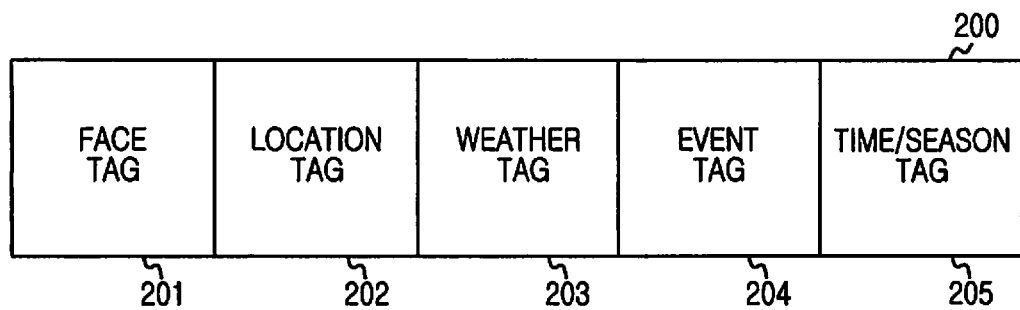
FIG. 2 is a diagram illustrating tag information added to contents, according to an embodiment of the present disclosure.

FIG. 2 is a diagram illustrating tag information added to contents according to an embodiment of the present disclosure.

Referring to FIG. 2, a face tag 201, a location tag 202, a weather tag 203, an event tag 204, and a time/season tag 205 is added to content such as a picture. The present disclosure is not limited to the tag information and more tag information may be added or deleted according to various embodiments.

The tag is a keyword or a classification provided as metadata of information related to the content. Several tags may be attached to any one piece of information to show association of the information in several aspects and to enable easy access to information or data classified in this manner. This allows a user to easily search for the information or to associate the information with other data.

The face tag 201 is information about a person's face included in a picture, the location tag 202 is information of a location at which a picture is taken, the weather tag 203 is weather information when a picture is taken, the event tag 204 is event information related to a picture, and the time/season tag 205 is time and season information related to when a picture is taken.

Tag information added to a picture may be determined by a user input or may be received from another external device (e.g., a server, a GPS receiver). For example, the location tag 202 may be a GPS coordinate received from a GPS receiver or an address in which a GPS coordinate is converted (e.g., longitude 37.493445, latitude 127, 022213→Seocho 1-dong). The weather is classified into Sunny, Cloudy, Rainy, Snowy, Windy, and Clear, and the weather tag 203 may be selected by a user in a weather list or may be received and be determined by a server that provides weather information. The time/season tag 205 may include Spring, Summer, Fall, and Winter, January to December, or Morning, Afternoon, Night, and the time.

The face tag 201 is information about a person's face included in a picture and is information identifying the person related to the corresponding picture. A face image extracted from a picture using a face recognition technique is used as a face tag.

According to another embodiment of the present disclosure, by comparing a first face image recognized from a picture and a stored second face image, when matched face information exists, the stored second face image is used as a face tag. In this case, the face tag may further include a person's name corresponding to the matched face image, together with the face image. That is, the face tag, in this case, is the combination of the face image and the person's name.

According to another embodiment of the present disclosure, a face tag may be determined by a user input. For example, a face image and a person's name may be determined as a face tag of a corresponding picture by a user input.

The event tag 204 is information corresponding to an event related to a schedule, an event based on picture scene analysis, and an event (a comment and a description on a picture) related to a picture uploaded to Social Network Service (SNS).

Figure 3A:
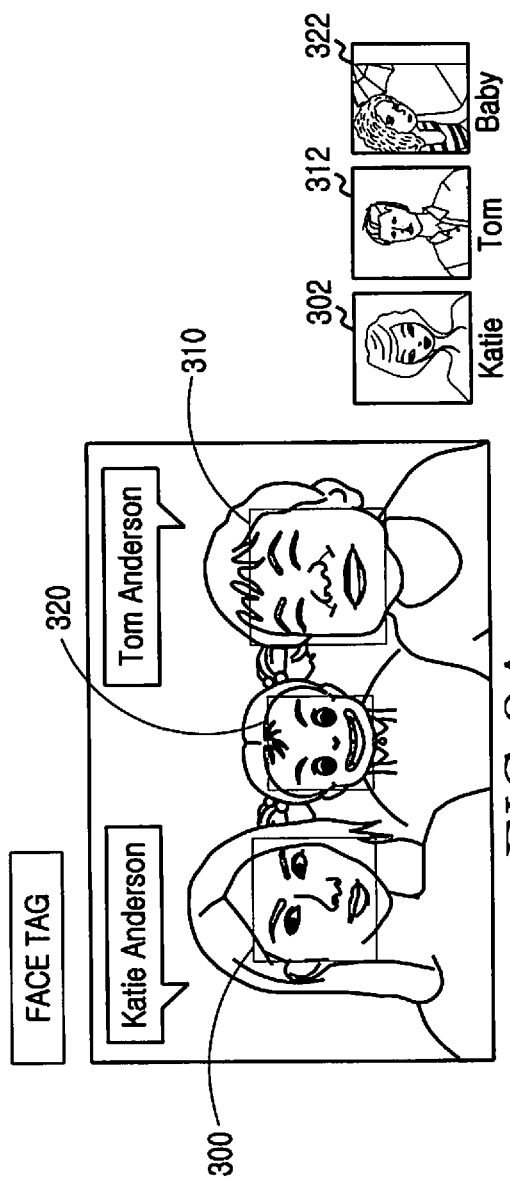
FIGS. 3A and 3B are diagrams illustrating face tag information, according to an embodiment of the present disclosure.
Figure 3B:
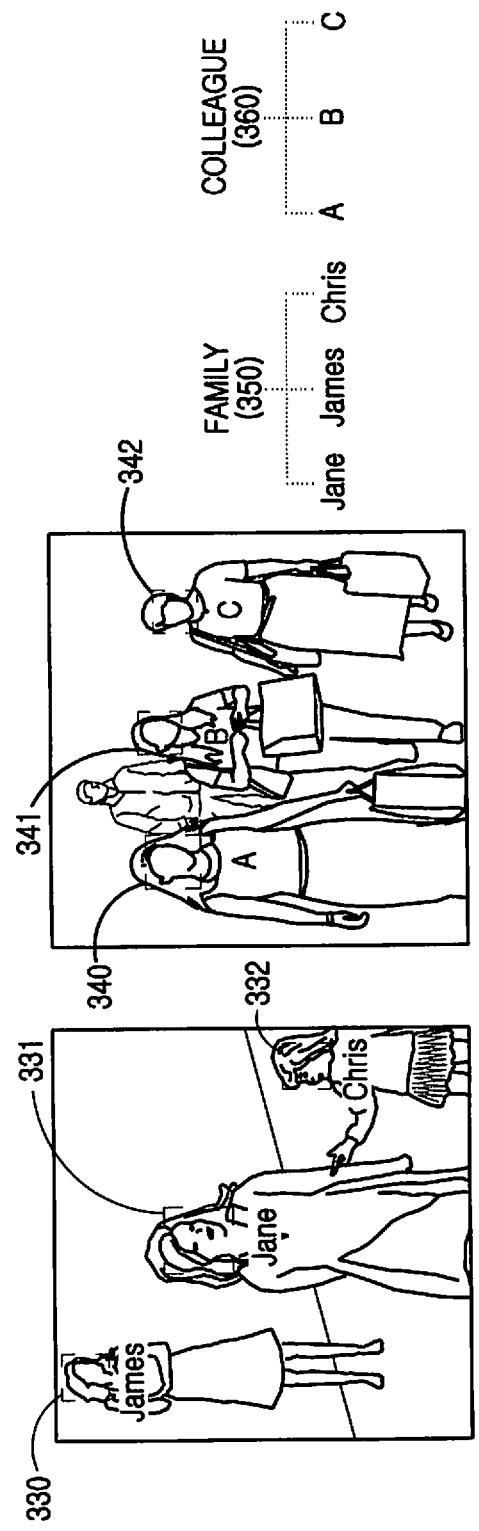

FIGS. 3A and 3B are diagrams illustrating face tag information, according to an embodiment of the present disclosure.

Referring to FIG. 3A, when a picture including Katie, Tom, and a baby exists, Katie, Tom, and the baby are added to the face tag 201 of the picture. A face image used as the face tag is an image extracted from a picture or a stored image. According to an embodiment of the present disclosure, the face tag 201 may be added by a user input regardless of a person's face included in a picture. For example, corresponding face images 302 and 312 are selected from a stored face image list to be set to a face tag of a picture. In the face tag, a person's entire face included in a picture may be used as a face tag or a partial view of person's face included in a picture may be used as a face tag.

Referring to FIG. 3B, Jane 331, James 330, and Chris 332 may be combined as a family group 350. Alternatively, A 340, B 341, and C 342 may be combined as a colleague group 360. A group of faces in an image, such as a family or colleague group, may be used as a setting condition, instead of using an individual person's face as a setting condition.

Figure 4:
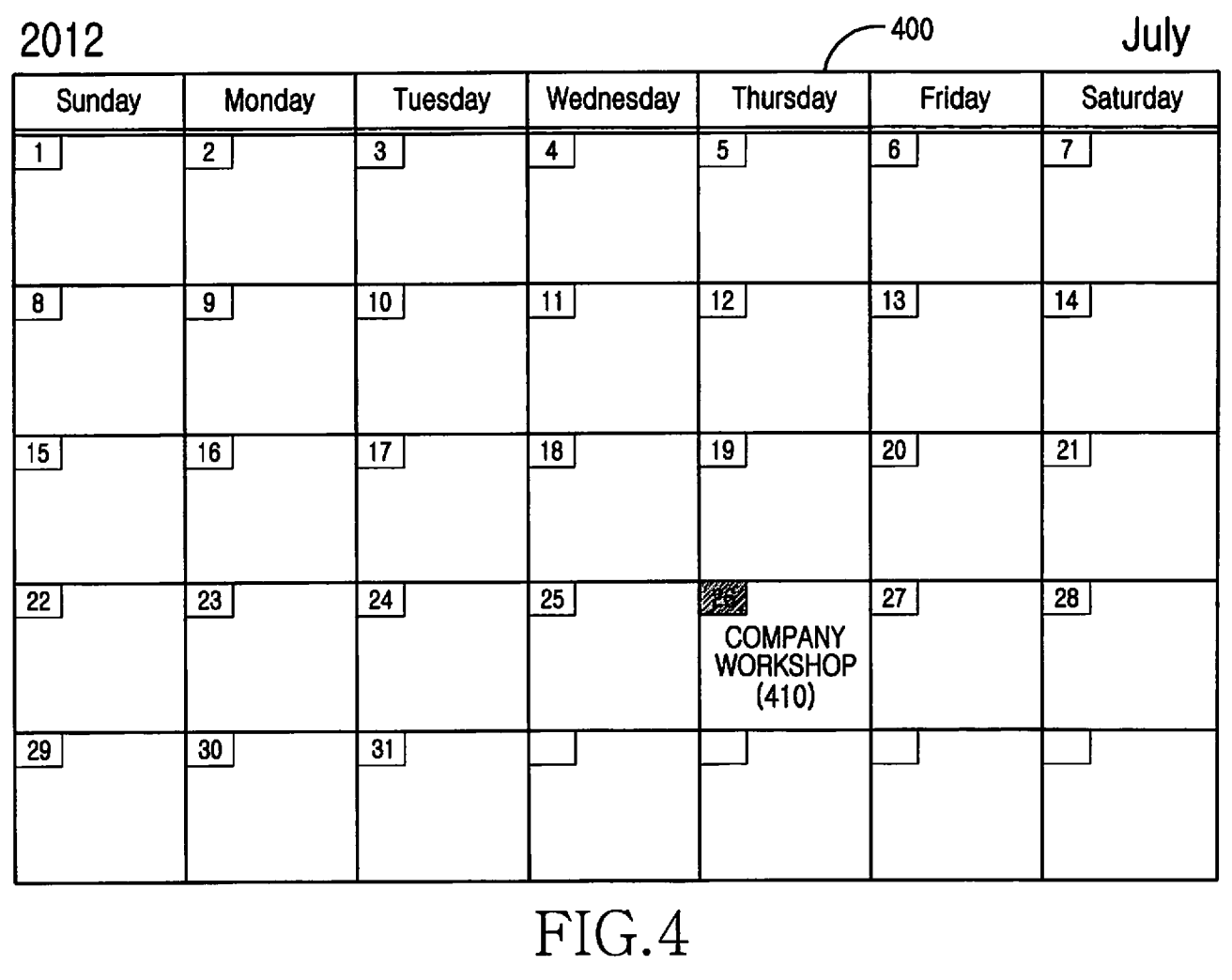

FIG. 4 is a diagram illustrating event tag information, according to a first embodiment of the present disclosure.

Referring to FIG. 4, in a schedule 400, when a company workshop event 410 exists on Jul. 26, 2012, information identifying that a picture is related to the company workshop is included in an event tag.

For example, company workshop information is included in an event tag of a picture photographed on Jul. 26, 2012, or on Jul. 26, 2012, pictures related to a company workshop are automatically displayed one by one.

Figure 5:
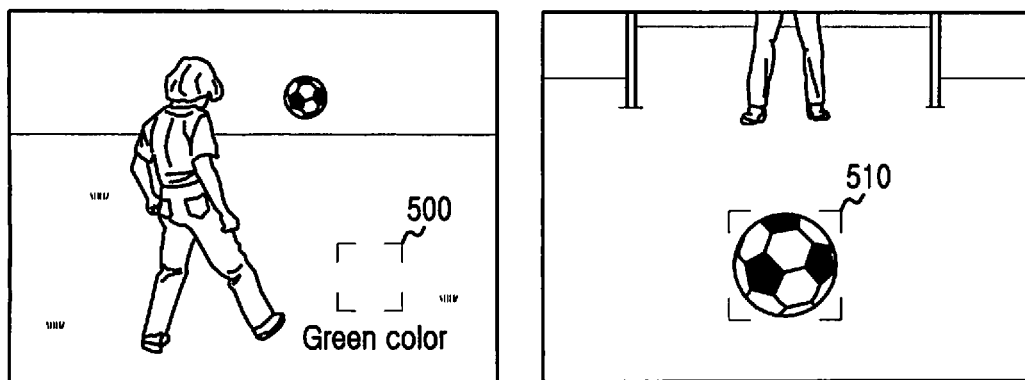
FIG. 5 is a diagram illustrating event tag information according to a second embodiment of the present disclosure.

FIG. 5 is a diagram illustrating event tag information, according to a second embodiment of the present disclosure.

Referring to FIG. 5, the event tag may recognize a scene by recognizing a general color of a picture or a prominently displayed object in the picture. For example, when a picture is photographed and the general color of the photographed picture is green 500, or when a prominently displayed object in a picture is recognized as a ball 510, the picture scene is recognized as soccer associated with a soccer field and a soccer ball.

Figure 6:
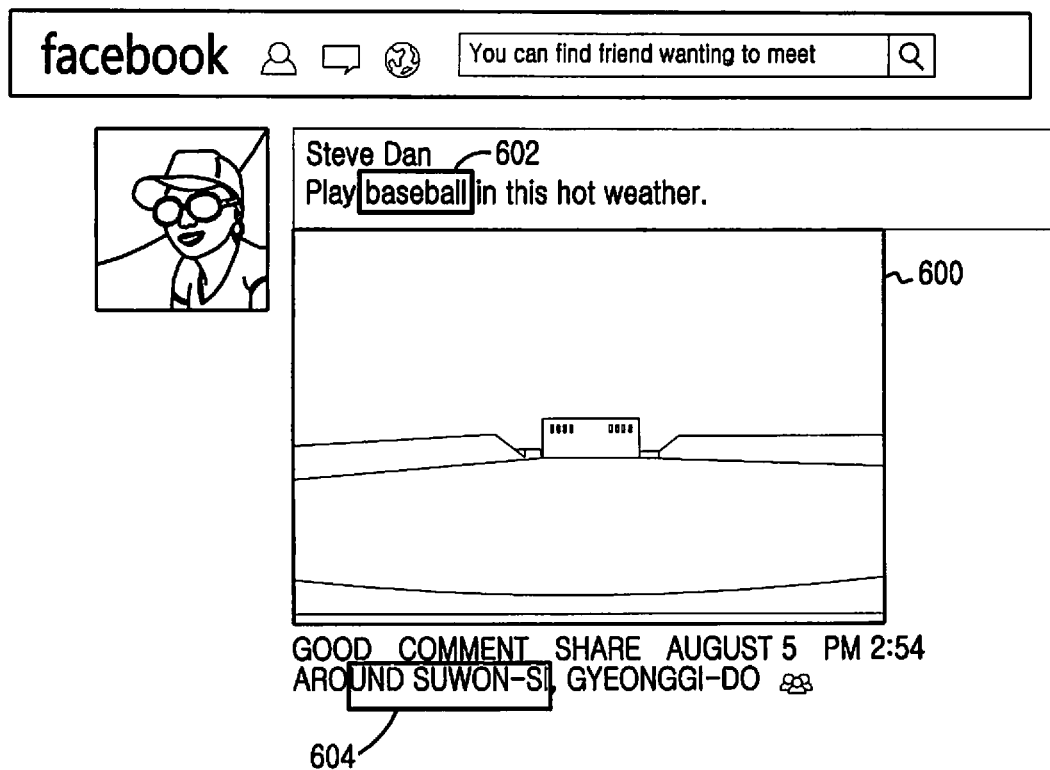
FIG. 6 is a diagram illustrating event tag information according to a third embodiment of the present disclosure.

FIG. 6 is a diagram illustrating event tag information, according to a third embodiment of the present disclosure.

Referring to FIG. 6, when a picture is a picture downloaded from a Social Network Service (SNS), by combining a picture description and a comment when the picture is uploaded, an event name is suggested.

For example, a keyword of "Baseball" and "Suwon" may be extracted based on a picture description 602 when Steve uploads a picture and a comment 604 in which another person writes. In this case, information of "Suwon baseball" is added as an event tag.

FIGS. 7A to 7D are diagrams illustrating determining a setting condition of a picture slide show, according to a first embodiment of the present disclosure.

Figure 7C:
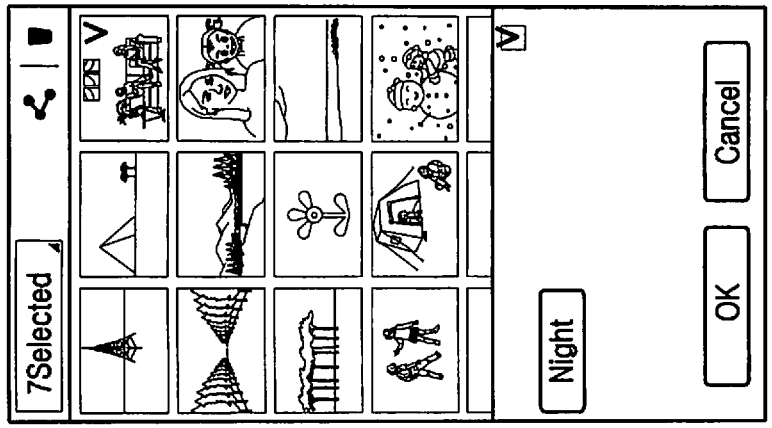
FIGS. 7A to 7D are diagrams illustrating determining a setting condition of a picture slide show, according to a first embodiment of the present disclosure.
Figure 7B:
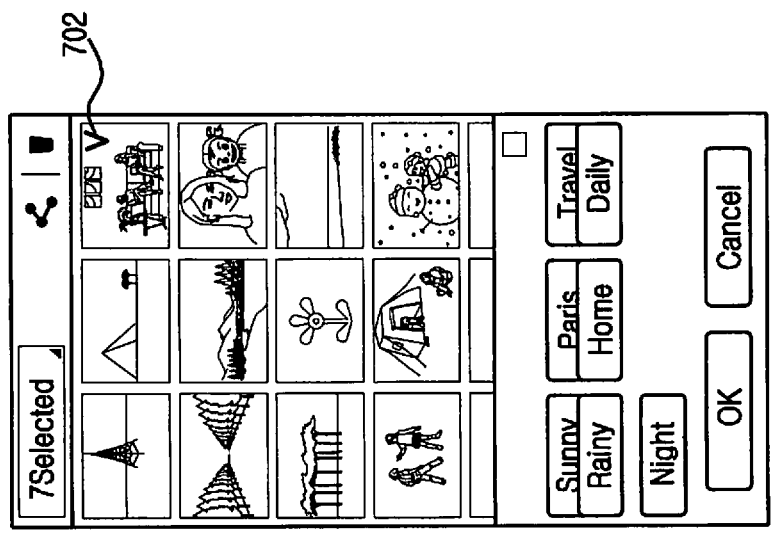
Figure 7A:
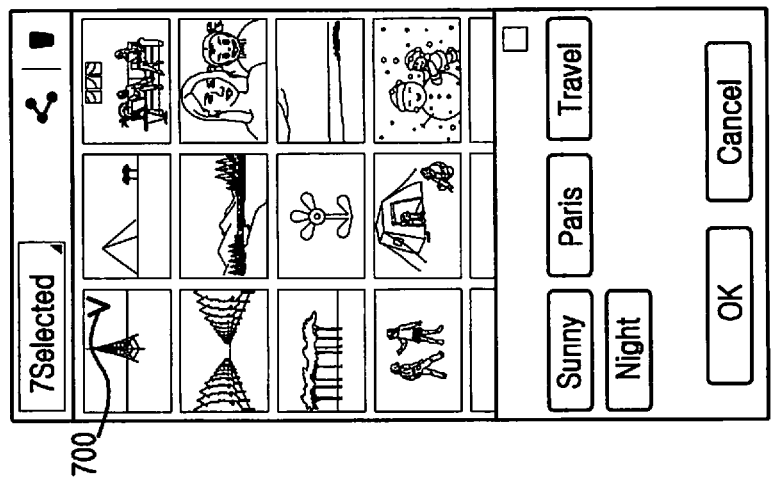

Referring to FIG. 7A, when all pictures or specific pictures in a memory area are displayed and when a picture is selected by a user from displayed pictures, tag information included in the selected picture is displayed. For example, when a picture 700 is selected, a weather tag (Sunny), a location tag (Paris), an event tag (travel), and a time/season tag (Night) included in the picture 700 are displayed.

Referring to FIG. 7B, when another picture is selected by the user from the displayed pictures, tag information included in the second selected picture is also displayed. For example, when a picture 702 is selected, a weather tag (Rainy), a location tag (Home), an event tag (Daily), and a time/season tag (Night) included in the picture 702 are displayed. In this case, tag information of both the previous selected picture 700 and the current selected picture 702 is displayed.

Referring to FIG. 7C, when a common tag information check box is selected, tag information commonly included in the selected pictures is displayed. For example, as shown in FIG. 7C, the tag information (Night) common to picture 700, shown in FIG. 7A, and picture 702, shown in FIG. 7B, is displayed. Here, "common tag information" is used to refer to common tag information included in a plurality of selected pictures. This is referred to as an "AND condition" and performs an intersection of the tag information of the plurality of selected images. When the common tag information check box is not selected, all of the tag information included in the plurality of selected pictures is displayed, as shown in FIG. 7B. This is referred to as an "OR condition" and performs a union of the tag information of the plurality of selected pictures.

Figure 7D:
Figure 7D:
Figure 7D:
Figure 7D:

Referring to FIG. 7D, other pictures including at least one of the tag information of the selected picture or pictures is displayed. For example, FIG. 7D shows, picture 700, picture 702, and the tag information associated with each, as well as other pictures which include tag information which is included in picture 700 or picture 702.

More specifically, FIG. 7D shows that a weather tag (Sunny), a location tag (Paris), an event tag (Travel), and a time/season tag (Night) are included in picture 700, and a face tag (Jane, Tom), a weather tag (Rainy), a location tag (Home), an event tag (Daily), and a time/season tag (Night) are included in picture 702. Here, common tag information of the picture 700 and the picture 702 is a time/season tag (Night). Further, a third picture is shown with tag information of a face tag (Alice, Bill), a weather tag (Sunny), a location tag (Versailles), an event tag (Picnic), and a time/season tag (Day). The third picture includes a weather tag (Sunny) which is tag information of the first picture 700. A fourth picture is shown with tag information of a face tag (James), a weather tag (Snowy), a location tag (Yosemite), an event tag (Travel), and a time/season tag (Day). The fourth picture includes an event tag (Travel) which is tag information of the first picture 700.

Although not shown, after images satisfying a setting condition are filtered, images to configure a slide show are displayed in a thumbnail form.

Figure 8A:
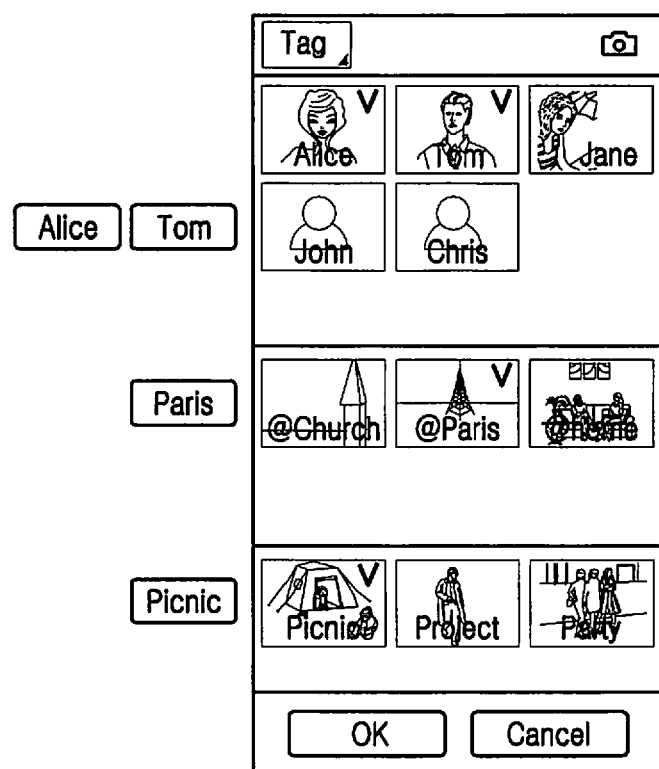
FIGS. 8A and 8B are diagrams illustrating determining a setting condition of a picture slide show according to a second embodiment of the present disclosure.
Figure 8B:
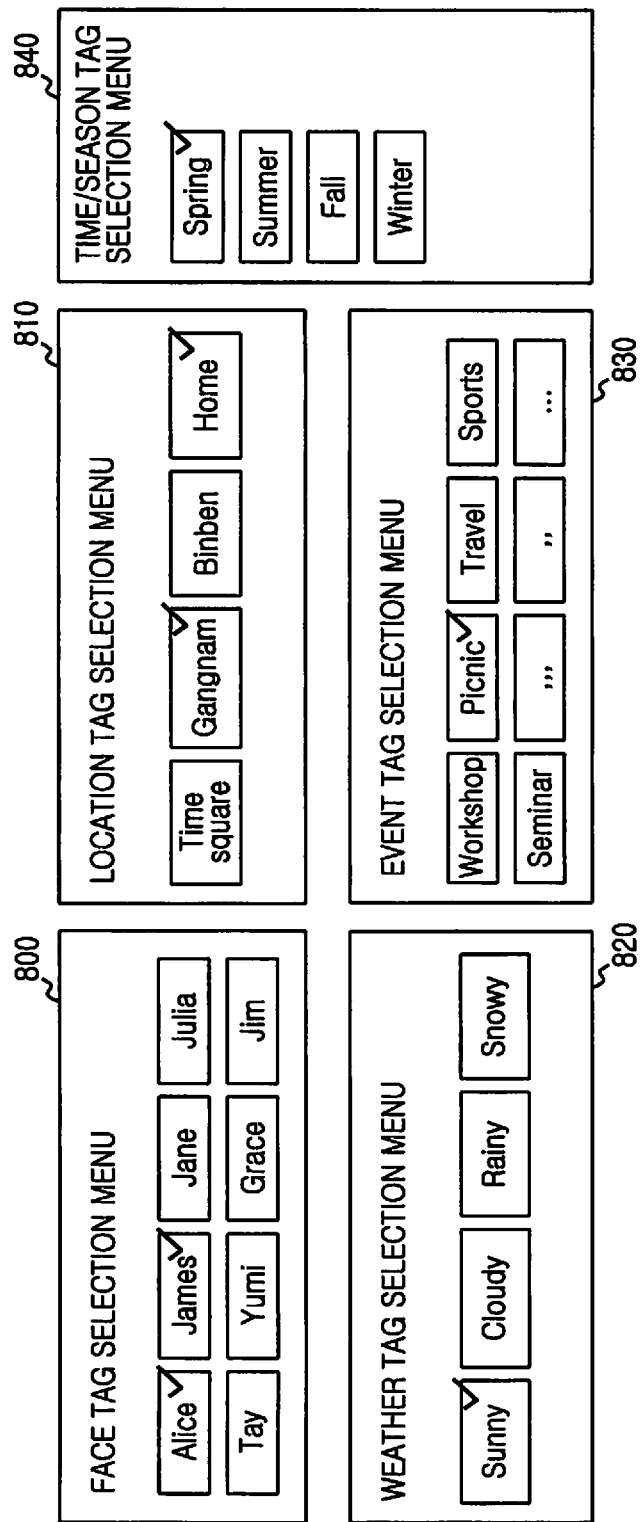

FIGS. 8A and 8B illustrate determining a setting condition of a picture slide show, according to a second embodiment of the present disclosure.

Referring to FIG. 8A, contents of a corresponding tag item are classified and displayed on a tag item basis, and at least one of tag information of the tag item are determined as a setting condition value by a user input (e.g., a user touch input). For example, in a face tag item, Alice, Tom, Jane, John, and Chris may be displayed, and Alice and Tom may be selected as a setting condition. In a location tag item, Church, Paris, and Home may be displayed, and Paris may be selected as a setting condition. In an event tag, Picnic, Project, and Party may be displayed, and Picnic may be selected as a setting condition. Here, contents of each tag item are contents extracted from pictures in a memory area or are predefined contents.

Referring to FIG. 8B, a face tag setting condition value is set through a face tag selection menu 800. In the face tag selection menu 800, Alice, James, Jane, *Julia*, Tay, Yumi, Grace, and Jim are displayed, and Alice and James are selected as a face tag setting condition by a user touch.

Contents of a face tag are contents extracted from pictures in a memory area or are predefined contents.

A location tag setting condition value is set through a location tag selection menu 810. In the location tag selection menu 810, Time square, Gangnam, Binben, and Home are displayed, and Gangnam and Home are selected as a location tag setting condition. Contents of a location tag are contents extracted from pictures in a memory area or are predefined contents.

A weather tag setting condition value is set through a weather tag selection menu 820. In the weather tag selection menu 820, Sunny, Cloudy, Rainy, and Snowy are displayed, and Sunny is selected as a weather tag setting condition. Contents of a weather tag are contents extracted from pictures in a memory area or are predefined contents.

An event tag setting condition value is set through an event tag selection menu 830. In the event tag selection menu 830, Workshop, Picnic, Travel, Sports, and Seminar are displayed, and Picnic is selected as an event tag setting condition. Contents of the event tag are contents extracted from pictures in a memory area or are predefined contents.

A time/season tag setting condition value is set through a time/season tag selection menu 840. In the time/season tag selection menu 840, Spring, Summer, Fall, and Winter are displayed, and Spring is selected as a time/season tag setting condition. Contents of the time/season tag are contents extracted from pictures in a memory area or are predefined contents.

Figure 9B:
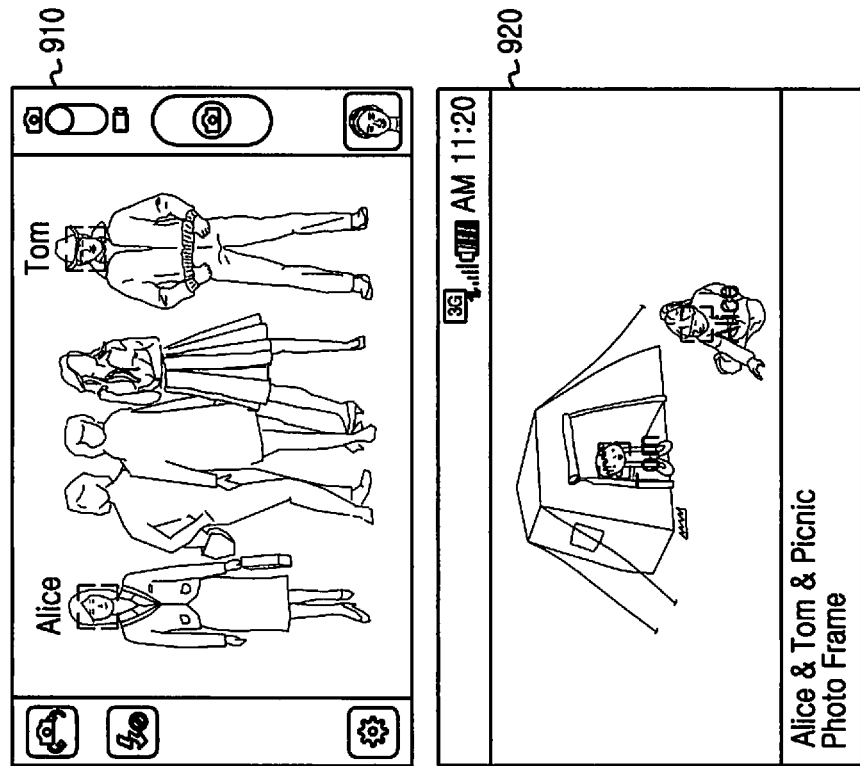
FIGS. 9A and 9B are diagrams illustrating a process of adding pictures to a slide show after the slide show is configured according to an embodiment of the present disclosure.
Figure 9A:
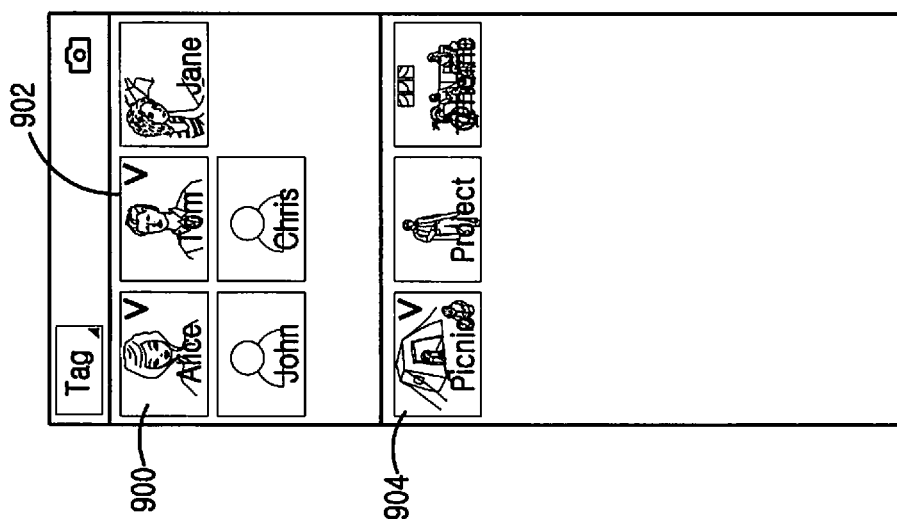

FIGS. 9A and 9B are diagrams illustrating a process of adding pictures to a slide show after the slide show is configured, according to an embodiment of the present disclosure.

Referring to FIG. 9A, current setting condition values on a tag item basis are shown. For example, "Alice" 900 and "Tom" 902 are selected as a face tag setting condition value, and "Picnic" 904 is selected as an event tag setting condition value.

Referring to FIG. 9B, an example is shown in which additional pictures satisfying a present setting condition value ("Alice" 900 and "Tom" 902, and "Picnic" 904) are automatically included in a picture group configuring a slide show. For example, when "Alice" 900 and "Tom" 902 are tagged in a newly added picture and when the picture is also tagged as including a "Picnic" 904 scene, the pictures are automatically included in a picture group to configure a slide show. In the example shown in FIG. 9B, additional pictures which may be included are a picture including only "Alice" 900 and "Tom" 902 in a "Picnic" 904 scene (920), or a picture including "Alice" 900 and "Tom" 902 and other persons in a "Picnic" 904 scene (910).

Figure 10:
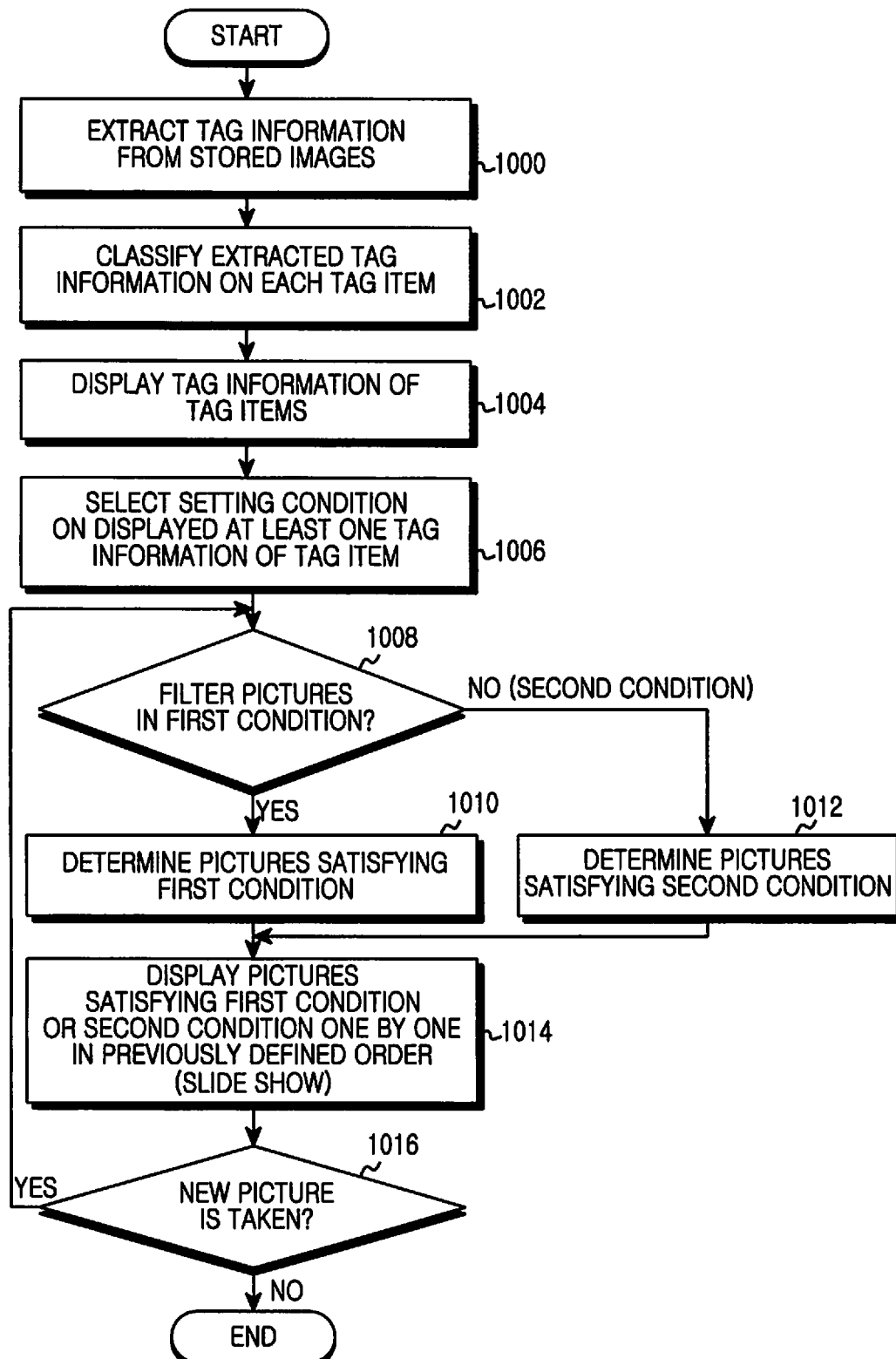
FIG. 10 is a flowchart illustrating a process of configuring a picture slide show of an electronic device, according to a first embodiment of the present disclosure.

FIG. 10 is a flowchart illustrating a process of configuring a picture slide show of an electronic device, according to a first embodiment of the present disclosure.

Referring to FIG. 10, in step 1000, the electronic device extracts tag information from images stored in a memory area.

Thereafter, in step 1002, the electronic device classifies the extracted tag information on each tag item basis for each image. The electronic device extracts face tag, location tag, event tag, weather tag, and time/season tag information from each picture.

Thereafter, in step 1004, the electronic device displays tag information of each tag item. For example, the electronic device displays the extracted tag information on a tag item basis (e.g., a face tag, a location tag, an event tag, a weather tag, and a time/season tag), as shown in FIGS. 8A to 8B.

Thereafter, the electronic device selects a setting condition value on one or more of the displayed tag information of each tag item, in step 1006. For example, Alice, Tom, Jane, John, and Chris are displayed in a face tag item, and Alice and Tom are selected as a setting condition. Church, Paris, and Home are displayed in a location tag item, and Paris is selected as a setting condition. Picnic, Project, and Party are displayed in an event tag, and Picnic is selected as a setting condition.

Thereafter, the electronic device determines whether to filter pictures in a first condition, in step 1008. If pictures are filtered in a first condition, the electronic device determines pictures satisfying a first condition, in step 1010. However, if pictures are not filtered in a first condition, the electronic device determines pictures satisfying a second condition, in step 1012. The first condition or the second condition may be determined as a configuration setting or a user selection. The first condition is to filter pictures based on the selected setting condition on a tag item basis in an AND operation. As described above with reference to FIG. 7C, this filters pictures containing tag information common to all pictures selected as a setting condition value. The second condition is to filter pictures based on the selected setting condition on a tag item basis in an OR operation. As described above with reference to FIG. 7B, this filters pictures containing tag information from any of the selected pictures. According to an embodiment of the present disclosure, a setting condition selected on a tag item basis may filter pictures using a combination of AND and OR operation (ex. a first tag information AND a second tag information OR a third tag information).

Thereafter, in step 1014, the electronic device displays pictures satisfying a first condition or a second condition one by one in a predefined order. In other words, the electronic device performs a slide show using the determined pictures. Here, images configuring a slide show may be displayed in most recent order or randomly.

Thereafter, the electronic device determines whether a new picture is taken in step 1016, and if a new picture is taken, the process continues at step 1008 and the electronic device determines pictures satisfying the first condition or the second condition and determines whether to add the new picture to the picture slide show.

Thereafter, the procedure of the present disclosure is terminated.

Figure 11:
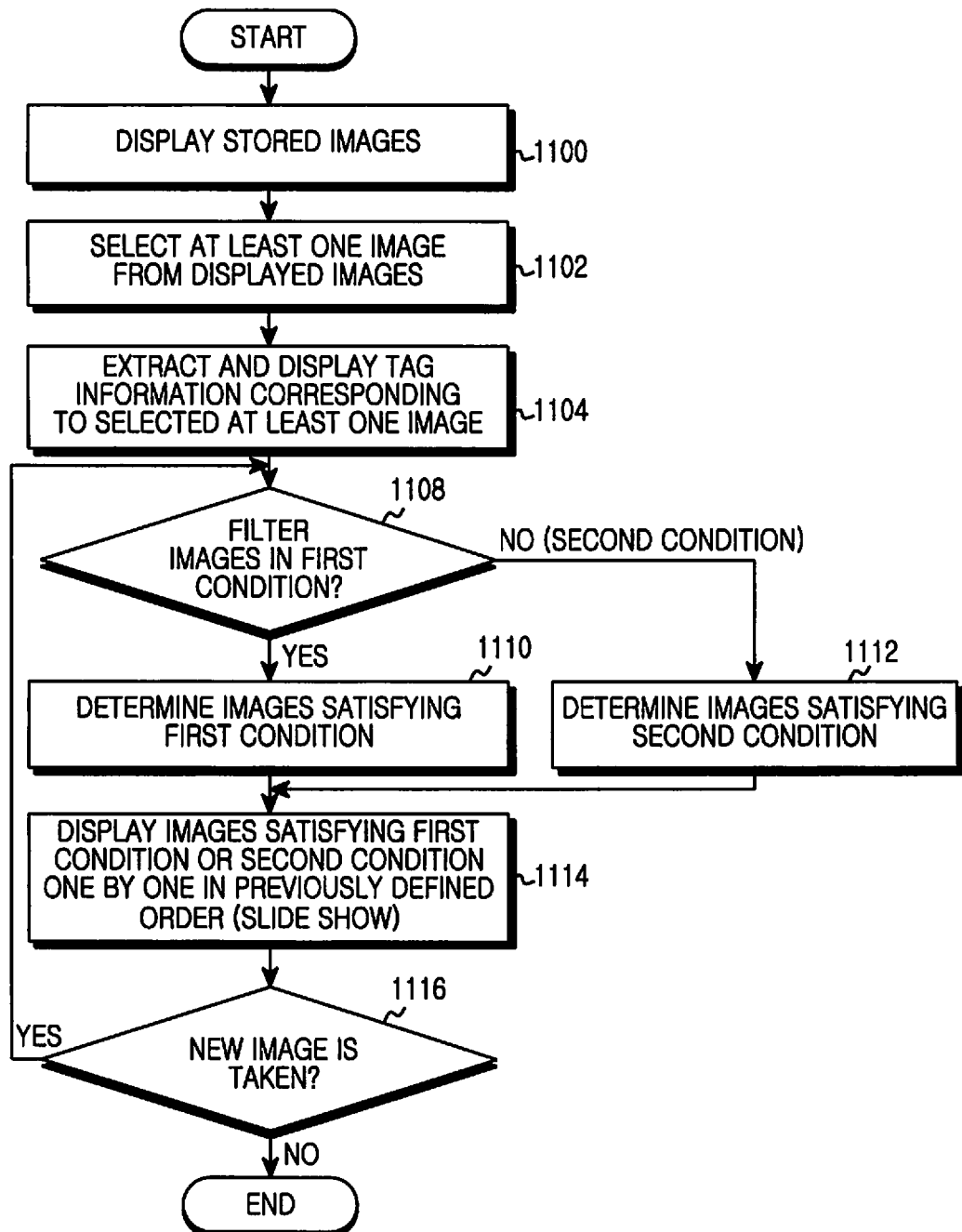
FIG. 11 is a flowchart illustrating a process of configuring a picture slide show of an electronic device, according to a second embodiment of the present disclosure.

FIG. 11 is a flowchart illustrating a process of configuring a picture slide show of an electronic device, according to a second embodiment of the present disclosure.

Referring to FIG. 11, the electronic device displays images stored in a memory area in step 1100.

Thereafter, in order to determine a setting condition, the electronic device selects at least one image from displayed images in step 1102.

Thereafter, the electronic device extracts and displays tag information corresponding to the selected images in step 1104 (see FIGS. 7A to 7C). The electronic device extracts face tag, location tag, event tag, weather tag, and time/season tag information from each image. That is, tag information included in the selected images is displayed.

Thereafter, the electronic device determines whether to filter images in a first condition in step 1108. If images are filtered in a first condition, the electronic device determines images satisfying a first condition in step 1110. However, if images are not filtered in a first condition, the electronic device determines images satisfying a second condition in step 1112. The first condition is to filter images based on the setting condition value in an AND operation on a tag item basis. This filters images containing tag information common to all of the selected images. The second condition is to filter images based on the setting condition value in an OR operation on a tag item basis. This filters images containing tag information from any of the selected pictures. According to an embodiment of the present disclosure, a setting condition may be filtered with a combination of AND and OR operation on a tag information (or a tag item) basis in which the selected at least one images include.

Thereafter, the electronic device displays pictures satisfying a first condition or a second condition one by one in a predefined order in step 1114. In other words, the electronic device performs a slide show using the determined pictures. Here, images configuring a slide show may be displayed in most recent order or randomly.

Thereafter, the electronic device determines whether a new picture is taken in step 1116, and if a new picture is taken, the process continues at step 1108 and the electronic device determines whether the new picture satisfies the first condition or the second condition and determines whether to add the new picture to the picture slide show.

Thereafter, the procedure of the present disclosure is terminated.

Figure 12:
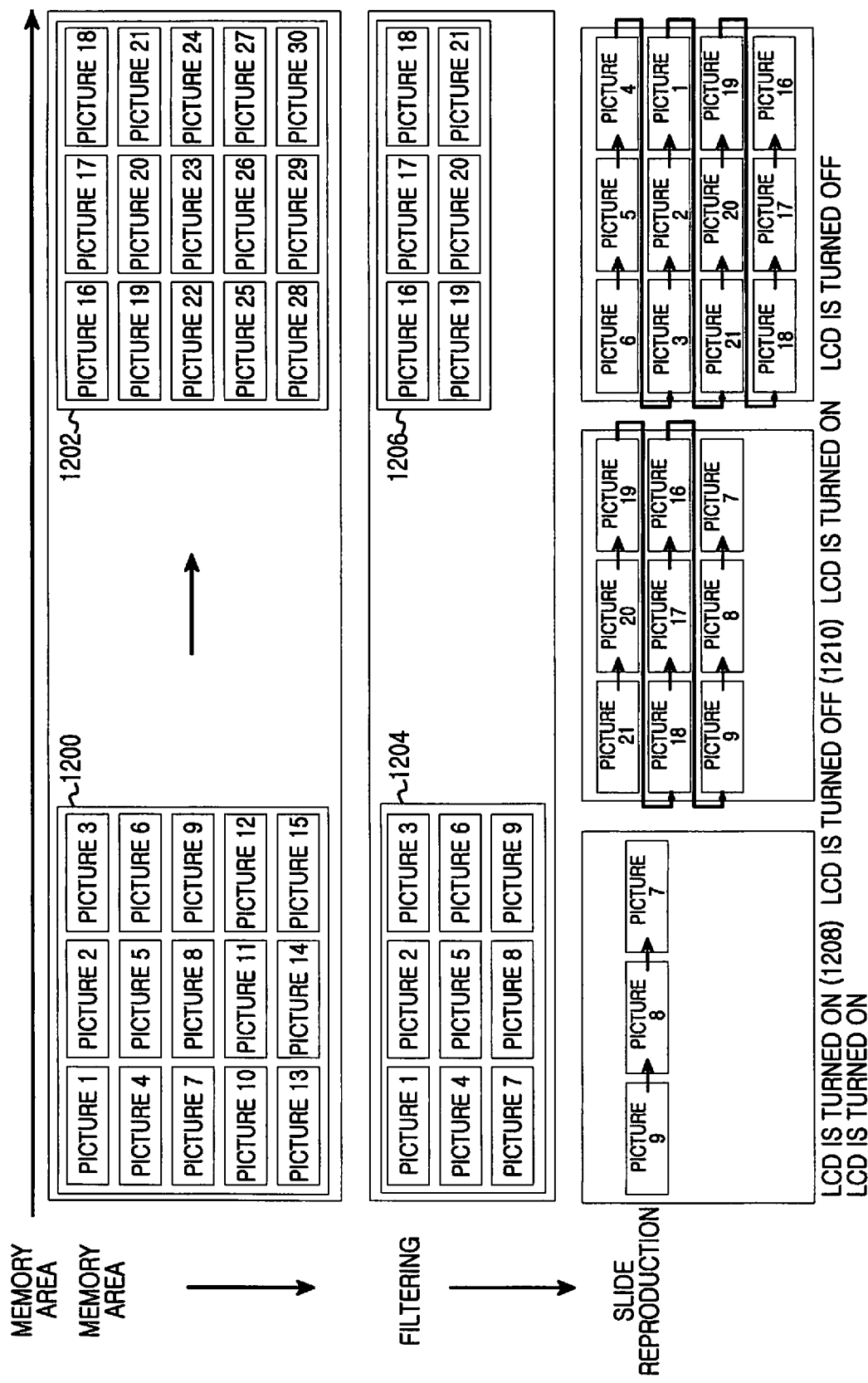
FIG. 12 is a diagram illustrating an order in which pictures are displayed in a picture slide show, according to an embodiment of the present disclosure.

FIG. 12 is a diagram illustrating an order in which pictures are displayed in a picture slide show, according to an embodiment of the present disclosure. Referring to FIG. 12, an example is provided describing the ordering of pictures in a picture slide show. In this example, pictures 1200 are stored in a memory area and pictures 1202 are newly added to a memory area by photographing, and pictures 1204 and 1206, are stored pictures of pictures 1200 and 1202, respectively, which satisfy a corresponding setting condition value.

Before additional pictures 1202 are generated, the pictures 1204 are determined to have satisfied a corresponding setting condition value, and are displayed in order of most to least recent while the display of the electronic device is in an LCD ON state 1208. For example, the pictures are displayed in the order of picture 9→picture 8→picture 7, etc. Here, while picture 7 is being displayed, it is assumed that the additional pictures 1202 are generated and newly added. In this case, the LCD ON state 1208 of the electronic device is changed to an LCD OFF state 1210 and the picture slide show is stopped. Thereafter, when the LCD OFF state 1210 is changed back to the LCD ON state 1208 by a user input, the pictures in the slide show are displayed in the order of picture 21→picture 20→picture 19→picture 18→picture 17→picture 16→picture 9→picture 8→picture 7, i.e. in most to least recent order.

According to another embodiment of the present disclosure, when the LCD OFF state 1210 is changed back to the LCD ON state 1208, the slide show resumes display at the picture immediately after the picture that was being displayed when the slide show was stopped. For example, if the slide show was stopped at picture 7, upon resuming, the slide show displays pictures in the order of picture 6→picture 5→picture 4→picture 3→picture 2→picture 1→picture 21→picture 20→picture 19→picture 18→picture 17→picture 16.

In the present disclosure, a slide show reproduction order is not limited to the most to least recent order and a slide show reproduction order may be determined using several methods. For example, a slide show may be displayed in alphabetical order or may be displayed in the least to most recent order.

Further, the present disclosure illustrates an example in which a slide show is stopped while the electronic device is in an LCD OFF state, but in another embodiment of the present disclosure, a slide show is continuously performed even when the electronic device is in an LCD OFF state.

Figure 13:
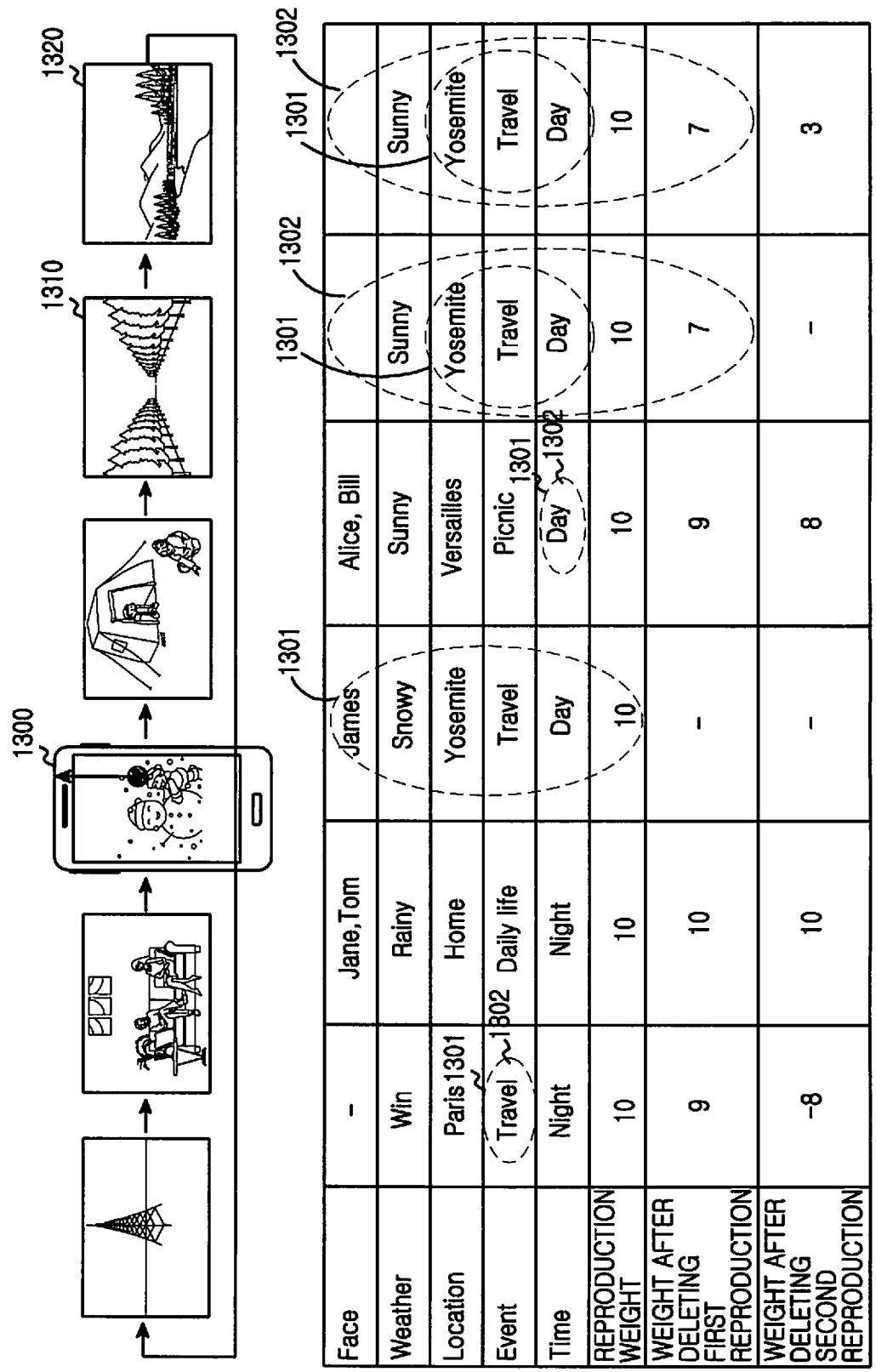
FIG. 13 is a diagram illustrating a process of deleting a picture from a picture slide show, according to an embodiment of the present disclosure.

FIG. 13 is a diagram illustrating a process of deleting a picture from a picture slide show, according to an embodiment of the present disclosure.

Referring to FIG. 13, while six pictures are displayed in a picture slide show, when deleting one of the pictures, an example of reducing a weight of other pictures associated with tag information included in the deleted picture is illustrated. Here, when a weight of a picture that is not deleted is dropped to a threshold or below a threshold, the picture is automatically deleted from the picture slide show list. It is assumed that a reproduction weight of an initial picture is defaulted at 10. According to an embodiment of the present disclosure, a weight is assigned to each tag item of a picture. This weight is referred to as a reproduction weight. For example, a reproduction weight of the face tag may be 10, a reproduction weight of the location tag may be 10, a reproduction weight of the event tag is 10, and a reproduction weight of the time tag may be 10. When tag information does not exist within the picture, a reproduction weight of that tag is 0.

For example, when a picture slide show is displayed, after a user selects a third picture 1300, if the third picture 1300 is deleted from the picture slide show list by an action that pushes out a picture in a corresponding direction (hereinafter, referred to as a flick action), the reproduction weight of pictures including at least one of tag information 1301 (James, Snowy, Yosemite, Travel, and Day) of the third picture 1300 is reduced. That is, the reproduction weight of the first picture including Travel becomes 9 (=10−1), and the reproduction weight of the fourth picture including Day becomes 9 (=10−1), and the reproduction weight of the fifth picture and the sixth picture including Yosemite, Travel, and Day becomes 7 (=10−3). Thereafter, when the fifth picture 1310, in which the reproduction weight is 7, is deleted from the picture slide show list by a flick action, the reproduction weight of pictures including at least one of tag information 1302 (Sunny, Yosemite, Travel, and Day) of the fifth picture 1310 is reduced. That is, the reproduction weight of the first picture including Travel becomes 8(=9−1), the reproduction weight of the fourth picture including Day becomes 8(=9−1), and the reproduction weight of the sixth picture including Sunny, Yosemite, Travel, and Day becomes 3(=7−4).

As described above, in order to delete a similar picture based on the reproduction weight of a picture, when there is a picture corresponding with a setting condition value of the deleted picture—i.e. have at least one tag information of the deleted picture, the corresponding picture is automatically deleted from the picture slide show list.

For example, when wishing to display only family pictures on a background screen, if a family name is checked, only family pictures are reproduced on a background screen that recognizes only a family face. Further, even when a newly photographed family picture exists, a background screen is updated to be reproduced to a picture slide show including a recently photographed picture. Further, the present disclosure is not limited to displaying a picture slide show. For example, when a singer's name is selected as a setting condition in a music player, the electronic device may search for only music with the name of the selected singer. If singer A, for example, is selected as a setting condition, when music satisfying the setting condition in a music play list is found, then a new play list is formed. When the setting condition is determined by a user input, if singer A satisfying the setting condition is included in newly stored or input contents, existing contents on a server, or acquired contents, the play list is automatically updated.

Figure 14:
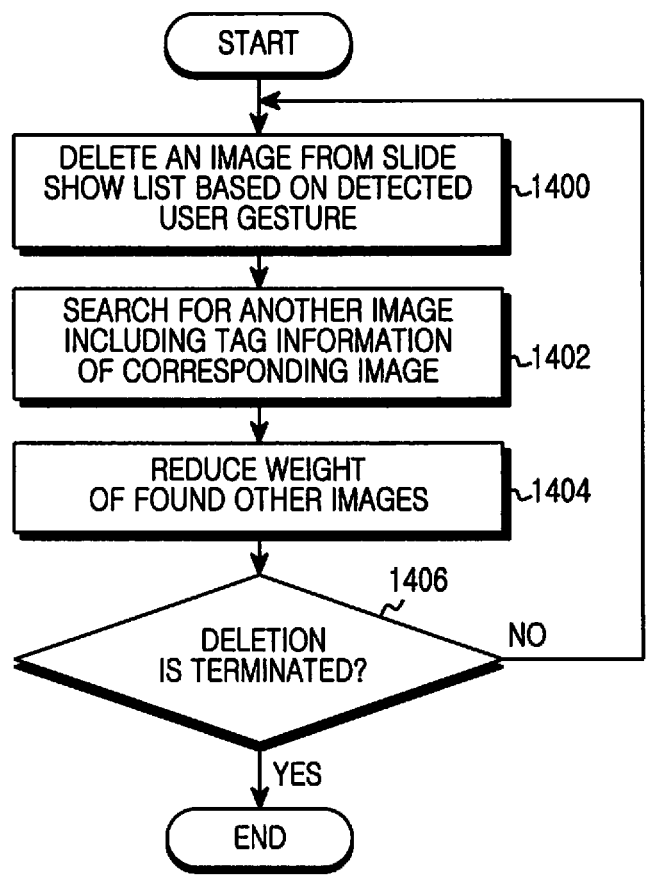
FIG. 14 is a flowchart illustrating a process of deleting a picture from a picture slide show, according to an embodiment of the present disclosure.

FIG. 14 is a flowchart illustrating a process of deleting a picture from a picture slide show, according to an embodiment of the present disclosure.

Referring to FIG. 14, in step 1400, the electronic device detects a user gesture which deletes an image from a picture slide show list and deletes the image.

Thereafter, in step 1402, the electronic device searches for other images in the slide show list, including the tag information of the deleted image. In step 1404, the electronic device, reduces a reproduction weight of each of the found images by a value equal to the number of corresponding tag items included in the initial deleted image. For example, as shown in FIG. 13, a reproduction weight of a picture is reduced according to the number of corresponding tag items of the initial deleted image.

Thereafter, in step 1406, the electronic device determines whether deletion is terminated, and if deletion is not terminated, the process continues at step 1400, and if deletion is terminated, the procedure of the present disclosure is terminated.

Although not shown, when a reproduction weight of a picture reaches a threshold or below a threshold, the picture is automatically deleted from the slide show list.

Figure 15:
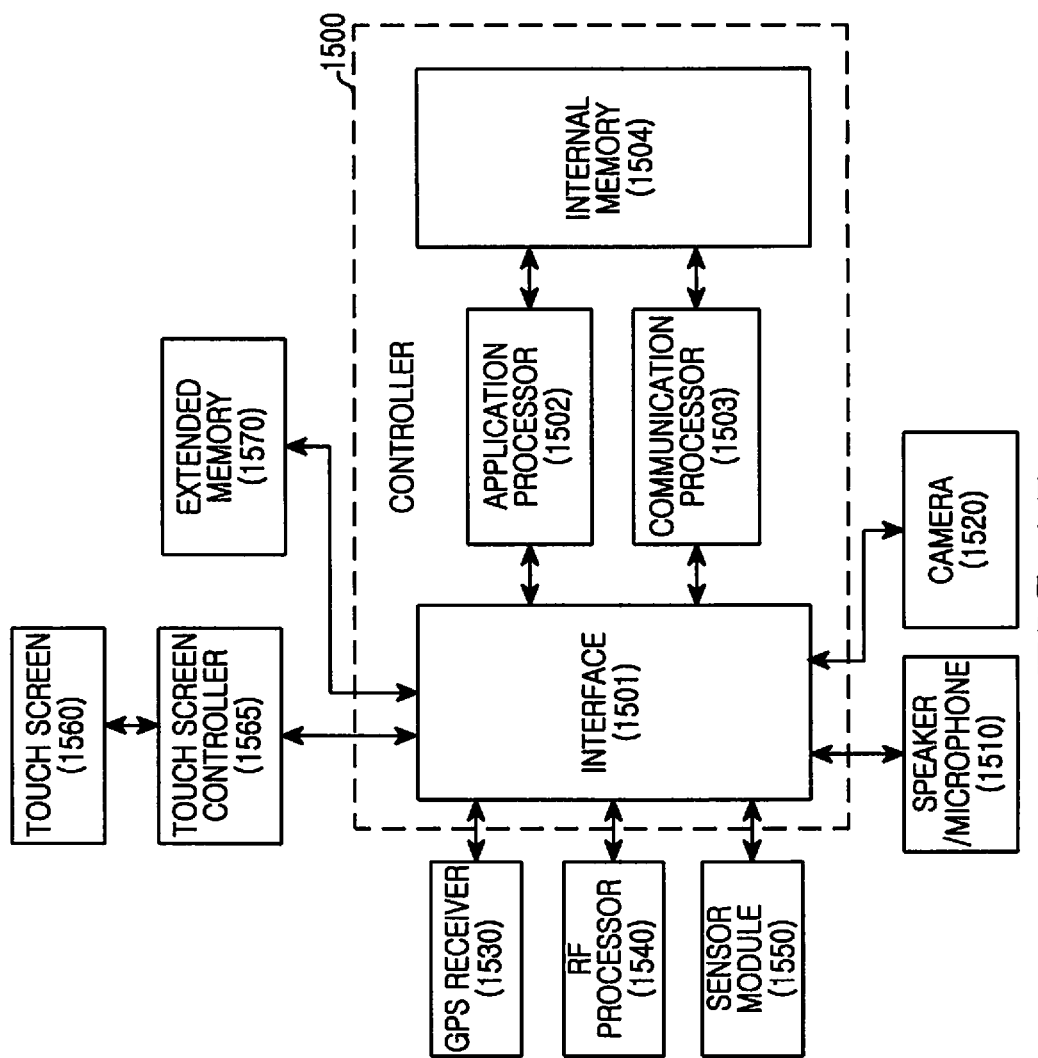
FIG. 15 is a block diagram illustrating a configuration of an electronic device, according to an embodiment of the present disclosure.

FIG. 15 is a block diagram illustrating a configuration of an electronic device, according to an embodiment of the present disclosure.

The electronic device is a portable electronic device and may be a device such as a portable terminal, a mobile terminal, a mobile pad, a media player, a tablet computer, a handheld computer, or a Personal Digital Assistant (PDA). Further, the electronic device may be a random portable electronic device including a device in which two or more functions of such devices are coupled.

Referring to FIG. 15, the electronic device includes a controller 1500, a speaker/microphone 1510, a camera 1520, a GPS receiver 1530, a Radio Frequency (RF) processor 1540, a sensor module 1550, a touch screen 1560, a touch screen controller 1565, and an extended memory 1570.

The controller 1500 includes an interface 1501, at least one of application processor 1502 and communication processor 1503, and an internal memory 1504. The entire controller 1500 may be referred to as a processor. The interface 1501, the application processor 1502, the communication processor 1503, and the internal memory 1504 may be separate constituent elements or may be integrated in at least one integrated circuit.

The application processor 1502 performs several functions for the electronic device by executing several software programs. The communication processor 1503 performs processing and control for audio communication and data communication. Further, in addition to such a common function, by executing a specific software module (instruction set) stored at the extended memory 1570 or the internal memory 1504, the application processor 1502 and the communication processor 1503 perform specific functions corresponding to the software module. That is, by executing software modules stored at the extended memory 1570 or the internal memory 1504, the application processor 1502 and communication processor 1503 perform a method of playing and deleting contents of an electronic device.

For example, according to a first embodiment of the present disclosure, the application processor 1502 extracts tag information from images stored at a memory area, classifies the extracted tag information (e.g., a face tag, a location tag, an event tag, a weather tag, and a time/season tag) on an tag item basis to generate tag items for each image, displays tag items, selects a setting condition value on the displayed tag items, determines pictures satisfying a first condition, when filtering pictures in the first condition, and determines pictures satisfying a second condition, when filtering pictures in the second condition. The first condition is to filter pictures based on the setting condition value selected on a tag item basis in an AND operation, and the second condition is to filter pictures based on the setting condition value selected on a tag item basis in an OR operation. According to an embodiment of the present disclosure, a setting condition value selected on a tag item basis is filtered with a combination of AND and OR operation.

The application processor 1502 displays pictures satisfying a first condition or a second condition, one by one, in a predefined order, and when a picture is taken (i.e., when a picture is newly added/stored), the application processor 1502 determines whether a new picture satisfies the first condition or the second condition, and determines whether to add the picture to the picture slide show.

According to a second embodiment of the present disclosure, the application processor 1502 displays images stored at a memory area, selects at least one image from the displayed images in order to determine a setting condition value, extracts and displays tag information corresponding to the selected images, determines pictures satisfying a first condition, when filtering images in the first condition, and determines images satisfying a second condition, when filtering images in the second condition. The first condition is to filter images based on the setting condition value on a tag item basis in an AND operation. The second condition is to filter images based on the setting condition value on a tag item basis in an OR operation. According to an embodiment of the present disclosure, a setting condition value on a tag item basis may filter pictures using a combination of AND and OR operation.

Further, the application processor 1502 displays pictures satisfying the first condition or the second condition one by one in predefined order, determines whether a new picture satisfies the first condition or the second condition when a picture is newly added or stored, and determines whether to add the new picture to the picture slide show.

According to a method of deleting a target of a picture slide, the application processor 1502 detects a user gesture which deletes an image from a picture slide show list, searches for other images in the slide show list, including tag information of the deleted image, reduces a reproduction weight of each of the found images by the number of corresponding tag items, and automatically deletes corresponding pictures in a slide reproduction list, when the reproduction weight of the images reaches a threshold or below a threshold.

Another processor (not shown) may include at least one data processor, image processor, or codec. The data processor, image processor, or codec may be separately formed. Further, another processor may be formed with several processors that perform other functions.

The interface 1501 is connected to the touch screen controller 1565 and the extended memory 1570 of the electronic device.

The sensor module 1550 is coupled to the interface 1501 to perform several functions. For example, the sensor module 1550 may include a motion sensor and a photo sensor which are coupled to the interface 1501 to detect a motion of the electronic device and detect light from the outside. Further, other sensors such as a location measurement system, a temperature sensor, or a bio sensor may be connected to the interface 1501 to perform related functions.

The camera 1520 is coupled to the sensor module 1550 through the interface 1501 to perform a camera function such as a picture and video clip recording.

The RF processor 1540 performs a communication function. For example, a RF signal is converted to a base band signal under the control of the RF processor 1540 to provide to the communication processor 1503. Alternatively, the RF processor 1540 controls to convert and transmit a base band signal from the communication processor 1503 to a RF signal. Here, the communication processor 1503 processes a base band signal with various communication methods. For example, a communication method is not limited thereto and include a Global System for Mobile Communication (GSM) method, an Enhanced Data GSM Environment (EDGE) communication method, a Code Division Multiple Access (CDMA) communication method, a W-Code Division Multiple Access (W-CDMA) communication method, a Long Term Evolution (LTE) communication method, an Orthogonal Frequency Division Multiple Access (OFDMA) communication method, Wi-Fi communication method, a WiMax communication method or/and a Bluetooth communication method.

The speaker/microphone 1510 performs input and output of an audio stream such as voice recognition, voice duplication, digital recording, and a phone function. That is, the speaker/microphone 1510 converts a sound signal to an electric signal or converts an electric signal to a sound signal. Although not shown, an attachable and detachable earphone, headphone, or head set may be connected to an electronic device through an external port.

The touch screen controller 1565 is coupled to the touch screen 1560. The touch screen 1560 and the touch screen controller 1565 are not limited as described herein and may detect a contact and a motion or stop thereof using random multi-touch detection technology including other proximity sensor arrangements or other elements such as capacitive, resistivity, infrared rays, and surface sound wave technology for determining at least one contact point with the touch screen 1560.

The touch screen 1560 provides an input/output interface between the electronic device and a user. That is, the touch screen 1560 transfers a user's touch input to the electronic device. Further, the touch screen 1560 shows a visual output from the electronic device to the user. Such a visual output is represented in a form of a text, graphic, video, and a combination thereof.

The touch screen 1560 may use several displays. For example, the touch screen 1560 is not limited thereto and may use a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED).

The GPS receiver 1530 converts a signal received from an artificial satellite to information such as a location, a speed, and a time. The extended memory 1570 or the internal memory 1504 may include a non-volatile memory and/or a high speed Random Access Memory (RAM) such as at least one magnetic disk storage device, at least one light storage device and/or a flash memory (e.g., NAND, NOR).

The extended memory 1570 or the internal memory 1504 stores software. Software constituent elements include an operating system software module, a communication software module, a graphic software module, a user interface software module, a Motion Picture Experts Group (MPEG) module, a camera software module, and at least one application software module. Further, a module, which is a software constituent element, may be represented with a set of instructions and thus a module may be referred to as an instruction set. The module may further be referred to as a program.

Operation system software includes several software constituent elements that control a general system operation. A control of such a general system operation indicates, for example, memory management and control, storage hardware (device) control and management, and power control and management. Such operation system software performs a function of smoothly performing communication between several hardware (device) and software constituent elements (module).

The communication software module enables the electronic device to perform communication with another electronic device such as a computer, a server and/or a portable terminal through the RF processor 1540. The communication software module is formed in a protocol structure corresponding to a corresponding communication method.

A graphic software module includes several software constituent elements for providing and displaying graphics on the touch screen 1560. The term 'graphics' is used to refer to a text, a web page, an icon, a digital image, a video, and an animation.

A user interface software module includes several software constituent elements related to a user interface and includes contents on a changed state of the user interface or a condition in which a user interface state change is performed.

A camera software module includes a camera related software constituent element that allows a camera related process and functions.

An application module includes a web browser including a rendering engine, an e-mail, an instant message, word processing, keyboard emulation, an address book, a touch list, a widget, Digital Right Management (DRM), voice recognition, voice reproduction, a position determining function, and a location based service. The memories 1570 and 1504 may include modules (instructions) in addition to the above-described module. Alternatively, the application module may not use some modules (instructions), when not needed.

According to the present disclosure, the application module includes instructions (see FIGS. 10, 11, and 14) for playing and deleting contents of an electronic device a picture slide show.

For example, according to a first embodiment of the present disclosure, the application module extracts tag information from pictures stored at a memory area, generates tag items by classifying the extracted tag information on an item basis (e.g., a face tag, a location tag, an event tag, a weather tag, and a time/season tag), displays tag items, selects a setting condition value on the displayed tag items, determines pictures satisfying a first condition when filtering pictures on the first condition, and determines pictures satisfying a second condition when filtering pictures on the second condition. The first condition is to filter pictures based on the setting condition value selected on a tag item basis in an AND operation, and the second condition is to filter pictures based on the setting condition value selected on a tag item basis in an OR operation. According to an embodiment of the present disclosure, a setting condition value selected on a tag item basis may filter pictures using a combination of AND and OR operation.

The application module displays pictures satisfying a first condition or a second condition one by one in a predefined order, determines whether a new picture satisfies the first condition or the second condition when a picture is taken (i.e., a picture is newly added or stored), and determines whether to add the picture to the picture slide show.

Methods described in the claims and/or the specification according to embodiments of the present disclosure may be implemented in a form of hardware, software, or a combination thereof.

When the methods are implemented with software, a computer readable storage medium that stores at least one program (software module) is provided. At least one program stored at a computer readable storage medium is configured for execution by at least one processor within an electronic device. At least one program includes instructions that enable an electronic device to execute methods according to embodiments described in the specification and/or claims of the present disclosure.

Such a program (software module, software) may be stored at a non-volatile memory including a Random Access Memory (RAM) and a flash memory, a Read Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of the above. Further, each constituent memory is included in plural.

Further, the program may be stored at an attachable storage device that may access the electronic device through a communication network such as Internet, Intranet, a Local Area Network (LAN), a Wireless LAN (WLAN), or a Storage Area Network (SAN) or a communication network formed with a combination thereof. Such a storage device may access the electronic device through an external port.

Further, a separate storage device on the communication network may access a portable electronic device.

As described above, by dynamically playing contents according to a setting condition, a user may conveniently view a picture slide show. Further, the present disclosure removes the inconvenience of manually select a picture to include in a slide show.

Further, as a picture of a slide show is selected according to a setting condition, newly added pictures may be automatically included as a picture of the slide show.

While the present disclosure has been particularly shown and described with reference to the embodiments described herein, it will be understood by those skilled in the art that various changes in form and details is made without departing from the spirit and scope of the present disclosure, which is defined not by the detailed description and embodiments, but by the appended claims and their equivalents.

What is claimed is:

1. A portable communication device comprising:
    a touch screen;
    a memory; and
    a processor configured to:
        identify, with respect to a plurality of images stored in the memory, first tag information with which at least one first image of the plurality of images is tagged, second tag information with which at least one second image of the plurality of images is tagged, and third tag information with which at least one third image of the plurality of images is tagged,
        display, via the touch screen, a first menu related to the first tag information, a second menu related to the second tag information, and a third menu related to the third tag information in a form of a thumbnail,
        receive a selection of the first menu, the second menu, or the third menu, and
        display, via the touch screen, the at least one first image tagged with the first tag information, the at least one second image tagged with the second tag information, or the at least one third image tagged with the third tag information, based at least in part on the selection of the first menu, the second menu, or the third menu,
    wherein the first tag information corresponds to a location at which the at least one first image is taken,
    wherein the second tag information corresponds to an object recognized from the at least one second image, and
    wherein the third tag information corresponds to an application used to acquire the at least one third image.

2. The portable communication device of claim 1, wherein the processor is further configured to:
    display, via the touch screen, the at least one first image in a form of a slide show when the first menu is selected,
    display, via the touch screen, the at least one second image in a form of a slide show when the second menu is selected, or
    display, via the touch screen, the at least one third image in a form of a slide show when the third menu is selected.

3. The portable communication device of claim 1, wherein the processor is further configured to generate the first tag information based at least in part on a metadata of the first image.

4. The portable communication device of claim 1, further comprising:
    a satellite communication receiver configured to acquire location information corresponding to the location,
    wherein the processor is further configured to generate the first tag information based at least in part on the location information acquired using the satellite communication receiver.

5. The portable communication device of claim 1, wherein the processor is further configured to generate the second tag information based at least in part on an outcome of a face analysis with respect to the object.

6. The portable communication device of claim 5, wherein the processor is further configured to:
    generate fourth tag information based at least in part on name information received with respect to a face, and
    display, via the touch screen, the fourth tag information with one of the first image and the second image that corresponds to the name information.

7. The portable communication device of claim 1, wherein one of the first tag information and the at least one first image is displayed concurrently as at least part of the first menu,
    wherein one of the second tag information and the at least one second image is displayed concurrently as at least part of the second menu, and
    wherein one of the third tag information and the at least one third image is displayed concurrently as at least part of the third menu.

8. The portable communication device of claim 1, wherein the processor is further configured to:
    receive a selection of the first menu and the second menu, and display, via the touch screen, the at least one first image and the at least one second image based at least in part on the selection.

9. The portable communication device of claim 1, wherein the processor is further configured to:
receive a selection of the first menu and the second menu, and
display, via the touch screen, a portion of the at least one first image and the at least one second image based at least in part on the selection.

10. The portable communication device of claim 1, wherein the processor is further configured to:
receive a user input to select at least one displayed image, and
display, via the touch screen, tag information corresponding to the at least one selected image.

11. A method of displaying an image in an electronic device, the method comprising:
identifying, with respect to a plurality of images stored in a memory of the electronic device, first tag information with which at least one first image of the plurality of images is tagged, second tag information with which at least one second image of the plurality of images is tagged, and third tag information with which at least one third image of the plurality of images is tagged;
displaying a first menu related to the first tag information, a second menu related to the second tag information, and a third menu related to the third tag information in a form of a thumbnail;
receiving a selection of the first menu, the second menu, or the third menu; and
displaying the at least one first image tagged with the first tag information, the at least one second image tagged with the second tag information, or the at least one third image tagged with the third tag information, based at least in part on the selection of the first menu, the second menu, or the third menu,
wherein the first tag information corresponds to a location at which the at least one first image is taken,
wherein the second tag information corresponds to an object recognized from the at least one second image, and
wherein the third tag information corresponds to an application used to acquire the at least one third image.

12. The method of claim 11, wherein displaying the at least one first image tagged with the first tag information, the at least one second image tagged with the second tag information, or the at least one third image tagged with the third tag information comprises:

displaying the at least one first image in a form of a slide show when the first menu is selected,
displaying the at least one second image in a form of a slide show when the second menu is selected, or
displaying the at least one third image in a form of a slide show when the third menu is selected.

13. The method of claim 11, further comprising generating the first tag information based at least in part on a metadata of the first image.

14. The method of claim 11, further comprising:
acquiring location information corresponding to the location using a satellite communication receiver,
generating the first tag information based at least in part on the location information.

15. The method of claim 11, further comprising generating the second tag information based at least in part on an outcome of a face analysis with respect to the object.

16. The method of claim 15, further comprising:
generating fourth tag information based at least in part on name information received with respect to a face, and
displaying the fourth tag information with one of the first image and the second image that corresponds to the name information.

17. The method of claim 11, wherein one of the first tag information and the at least one first image is displayed concurrently as at least part of the first menu,
wherein one of the second tag information and the at least one second image is displayed concurrently as at least part of the second menu, and
wherein one of the third tag information and the at least one third image is displayed concurrently as at least part of the third menu.

18. The method of claim 11, further comprising:
receiving a selection of the first menu and the second menu, and
displaying the at least one first image and the at least one second image based at least in part on the selection.

19. The method of claim 11, further comprising:
receiving a selection of the first menu and the second menu, and
displaying a portion of the at least one first image and the at least one second image based at least in part on the selection.

20. The method of claim 11, further comprising:
receiving a user input to select at least one displayed image, and
displaying tag information corresponding to the at least one selected image.

* * * * *